United States Patent [19]

Skoultchi et al.

[11] Patent Number: 5,310,835
[45] Date of Patent: May 10, 1994

[54] TRANSPARENT TWO-PART ACRYLIC ADHESIVE COMPOSITION AND THE METHOD OF USE THEREOF

[75] Inventors: Martin M. Skoultchi, Somerset; Dilip K. Ray-Chaudhuri, Bridgewater, both of N.J.

[73] Assignee: National Starch and Chemical Investment Holding Corporation, Wilmington, Del.

[21] Appl. No.: 130,069

[22] Filed: Sep. 30, 1993

[51] Int. Cl.⁵ ............................................ C08F 4/52
[52] U.S. Cl. ................................. 526/198; 526/328; 526/329.1
[58] Field of Search ............... 526/198, 196, 134, 328, 526/329.1

[56] References Cited

U.S. PATENT DOCUMENTS 5,106,928  4/1992  Skoultchi et al. ............... 526/196
5,143,884  9/1992  Skoultchi et al. ............... 502/160

Primary Examiner—Joseph L. Schofer
Assistant Examiner—Jeffrey T. Smith
Attorney, Agent, or Firm—Eugene Zagarella, Jr.

[57] ABSTRACT

In a two-part adhesive composition wherein one-part comprises a polymerizable acrylic monomer and an organoboron amine complex and the second-part contains an organic acid destabilizer and optional acrylic polymer, the improvement wherein a transparent or clear bond is provided in the cured adhesive composition by having about 45% or more by weight of the total acrylic monomer in the composition comprising selected phenyl containing acrylic compounds.

12 Claims, No Drawings

TRANSPARENT TWO-PART ACRYLIC ADHESIVE COMPOSITION AND THE METHOD OF USE THEREOF

BACKGROUND OF THE INVENTION

This invention relates to an improved two-part adhesive composition useful as a structural adhesive in forming transparent or clear bond lines. More particularly, this invention involves an improved adhesive composition wherein one-part comprises a polymerizable acrylic monomer and an organoboron amine complex and the second-part contains an organic acid destabilizer and optional polymerizable acrylic monomer wherein the improvement comprises using about 45% or more by weight of selected phenyl containing acrylic compounds as the acrylic monomer.

Adhesive compositions including acrylic adhesives such as solutions of elastomeric polymers in soluble polymerizable acrylic or methacrylic monomers are well known in the art. These compositions which are especially known for their toughening properties generally include a redox system which comprises a catalyst or initiator, an accelerator and an activator to initiate cure, as well as other additives such as adhesion promoters, chelators, cross-linking agents, thickeners and plasticizers. Two-part acrylic adhesives where an activator is added as a separate second component are widely used and are known for curing speed as well as toughness. The catalyst or initiator typically used in these adhesives are free-radical initiators of the organic peroxy or hydroperoxy type, perester or peracid type.

Many known adhesive systems, such as the epoxies, require a thermal cure to obtain desirable properties, while others that do not, usually require prolonged cure times. More recently adhesive compositions with organoboron amine complex initiators have been developed which cure at room temperature and reach high tensile strength in a short period of time. These new adhesive compositions which have shown exceptional stability on ageing while exhibiting both high tensile strength and high peel strength are disclosed in U.S. Pat. Nos. 5,106,928 and 5,143,884 issued to M. Skoultchi, et al. on Apr. 21, 1992 and Sep. 1, 1992 respectively. This adhesive is useful in structural systems particularly those requiring fast curing at room temperature. However, when such adhesives cure they form an opaque bond-line making them less desirable for use with clear substrates such as glass and clear plastics.

Accordingly, there is need for an adhesive composition which provides transparent or clear bond lines upon curing making it particularly useful in structural systems employing glass, plastic or other clear substrates.

SUMMARY OF THE INVENTION

This invention involves an improved adhesive composition providing a transparent or clear bond in the cured adhesive wherein one-part comprises a polymerizable acrylic monomer and an effective amount of a stabilized organoboron amine complex initiator of the formula:

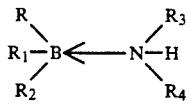

where R, $R_1$ and $R_2$ are alkyl of 1 to 10 carbon atoms or phenyl, $R_3$ and $R_4$ are hydrogen or alkyl of 1 to 10 carbon atoms; or

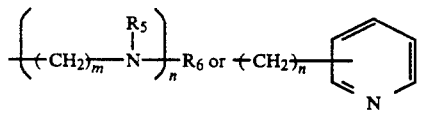

where $R_5$ and $R_6$ are hydrogen or alkyl of 1 to 10 carbon atoms, m is 2 to 10 and n is 1 to 6;

the second part contains an effective destabilizing amount of an organic acid activator having the formula:

R—COOH where R is H, alkyl or alkenyl of 1 to 8 carbon atoms or aryl of 6 to 10 carbon atoms; and wherein in the improved composition the acrylic monomer comprises about 45%, or more, by weight, based on the total weight of acrylic monomer in the composition, of a monomer selected from the group consisting of: benzyl acrylate or methacrylate, 2-phenoxyethyl acrylate or methacrylate, phenyl acrylate or methacrylate, and 2-phenylethyl acrylate or methacrylate.

DETAILED DESCRIPTION OF THE INVENTION

The adhesive composition of this invention contains a two part initiator, one part of which is the stabilized organoboron amine complex of the structure (I) which is made by combining an organoboron compound with a primary or secondary amine or polyamine containing primary or secondary amines. The organoboron compound has the formula:

where R, $R_1$ and $R_2$ are alkyl of 1 to 10 carbon atoms or phenyl, preferably alkyl of 1 to 4 carbons. In this formula, the alkyl groups may be straight or branch chained and the phenyl group may contain substituents such as alkyl, alkoxy or halogen. Illustrative compounds of this type include, e.g., trimethylboron, triethylboron, tri-n-butylboron, tri-sec-butylboron and tri-isobutylboron.

The amine which is used in forming the organoboron amine complex (I) may be any primary or secondary amine or polyamine containing a primary or secondary amine, or ammonia and having the following formula:

where $R_3$ and $R_4$ are hydrogen or alkyl of 1 to 10 carbon atoms, or

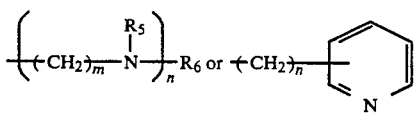

where $R_5$ and $R_6$ are hydrogen or alkyl of 1 to 10 carbon atoms, m is 2 to 10, and n is 1 to 6. The alkyl groups in this formula may be straight or branch chained. Preferably, the R groups noted in the amine will be hydrogen or alkyl of 1 to 4 carbon atoms, m will be 2 to 6 and more preferably 2 to 3 and n will be 1 to 2. Illustrative compounds of this type include, e.g., n-octylamine, 1,6-diaminohexane, diethylamine, dibutylamine, diethylene triamine, dipropylene diamine, ammonia, 1,3-propylenediamine and 1,2-propylenediamine.

The stabilized amine complex can be prepared by combining a solution of the organoboron with the amine under an inert atmosphere with cooling as needed.

The activator used as the second part or component of the initiator system will be a compound which will destabilize or liberate the free organoboron compound by removing the amine group and thereby allow it to initiate the polymerization process. This activator is an organic acid having the formula:

R—COOH where R is H, alkyl or alkenyl of 1 to 8 and preferably 1 to 4 carbon atoms, or aryl of 6 to 10, preferably 6 to 8 carbon atoms. It is further understood that the alkyl or alkenyl group of this organic acid may be straight or branch chained and the aryl may contain substituents such as alkyl, alkoxy or halogen. Illustrative examples of compounds of this type include: acrylic acid, methacrylic acid, benzoic acid, and p-methoxybenzoic acid.

Generally the initiator system of this invention will comprise the organoboron amine complex and an effective destabilizing amount of the organic acid activator. More particularly from about 0.1:1 to 200:1 parts by weight of acid to amine complex and preferably from about 1:1 to 24:1 parts by weight of acid to amine complex may be used.

The organoboron initiator systems as described above and as used in the adhesive composition of this invention is further described along with the method of preparation in U.S. Pat. Nos. 5,106,928 and 5,143,884 issued to M. Skoultchi, et al. on Apr. 21, 1992 and Sep. 1, 1992 respectively, and are incorporated herein by reference.

The adhesive composition of this invention comprises polymerizable acrylic monomer and particularly phenyl containing acrylic monomers selected from the group consisting of benzyl acrylate or methacrylate, 2-phenoxyethyl acrylate or methacrylate, phenyl acrylate or methacrylate, and 2-phenylethyl acrylate or methacrylate. Particularly preferred for use herein are the methacrylates and especially benzyl methacrylate and 2-phenoxyethyl methacrylate.

The selected phenyl containing acrylic monomers as described above must be present in amounts of about 45%, or more, i.e., 45 to 99.5% by weight, based on the total weight of acrylic monomers in the composition and preferably about 50% or more.

Other acrylic monomers in addition to the selected phenyl containing acrylic monomers may be used in the adhesive composition of this invention. It is further noted that use of the term acrylic or acrylate in this application is intended to include the methacrylic or methacrylate counterpart thereof.

Useful acrylic monomers include monofunctional, polyfunctional or combinations thereof. Such monomers include polyether diacrylates and dimethacrylates such as polyethylene glycol diacrylate and dimethacrylate and diglycerol; dimethacrylate of bis(ethylene glycol) adipate or maleate and the corresponding diacrylates and chloroacrylates; isocyanate-hydroxyacrylate or isocyanate-amino acrylate reaction products characterized as acrylate terminated polyurethanes and polyurides or polyureas; and the mono and polyacrylate and methacrylate esters of bisphenol type compounds. Other useful acrylic monomers are monofunctional acrylate and methacrylate esters and the substituted derivatives thereof such as hydroxy, amide, cyano, chloro and silane derivatives. These and other acrylic polymerizable monomers useful herein are disclosed in the previously referred to '928 and '884 patents, both of which are incorporated herein by reference.

The acrylic adhesive and organoboron amine complex initiators of this invention are particularly useful in elastomeric compositions. The elastomer or rubber polymers may be any of the typically available synthetic rubbers that are soluble in the monomer such as those based on polyisoprenes, polybutadienes, polyolefins, polyurethane, polyesters, etc. Examples of elastomeric materials include homopolymers such as polybutadiene, polyisoprene and polyisobutylene; diene type copolymers such as butadiene/styrene copolymer, butadiene/acrylonitrile copolymer, butadiene/methyl methacrylate copolymer and butadiene/alkyl acrylate copolymer; ethylene/vinyl acetate copolymers; ethylene/alkyl acrylate copolymers (1-8 carbons in the alkyl group), rubbery polyalkyl acrylates or copolymers thereof; polyurethane; chlorinated polyethylenes; and EPDM (ethylene/propylene/diene terpolymers).

The elastomers of these structures may contain a functional group at one or both ends or within a particular segment or repeating unit of the copolymer. Among the suitable functional groups are vinyl, epoxy, carboxyalkyl, and mercapto groups. Other functional groups may be employed as deemed useful as determined by routine experimentation.

One preferred group of elastomers are the block copolymers. Several such block copolymers are manufactured by Shell Chemical Company under the trade name Kraton and by Firestone under the trade name Stereon. In particular, Stereon 840A, a poly(styrene-b-butadiene-b-styrene) block copolymer, has been found to be especially useful in the instant adhesive composition. Other preferred block copolymers of this type are available under the trade name Solprene 416, manufactured by Phillips Petroleum Co.

The monomer solution containing the elastomer or rubbery polymer is commonly prepared by dissolving the elastomer in the monomer, which may be in the form of a syrup. In some cases, the monomer solution may be prepared by extracting a rubbery polymer from a latex of the rubbery polymer in water, as used for suspension polymerization, and then dissolving in the monomer.

The amount of the acrylic monomer including the selected phenyl containing acrylic monomers to be used in this invention may vary somewhat depending on the specific properties desired but generally about 10 to 90% by weight of the composition and preferably about 15 to 80% by weight is used. Adjustment within these ranges are easily made within the skill of the art. The elastomer is generally present in amounts of about 5 to 80% by weight and preferably about 20 to 60% by weight of the composition.

The second part of the initiator which contains the acid activator, preferably may also contain a peroxy or hydroperoxy component having the formula:

R—OOH where R is hydrogen, alkyl of 1 to 10 preferably 4 to 10 carbon atoms or aryl or alkaryl of 6 to 14, preferably 6 to 10 carbon atoms. Illustrative compounds of this type are t-butyl hydroperoxide and cumene hydroperoxide. Typically these hydroperoxy compounds which aid in the initiation of polymerization are used in the initiator system in amounts of about 0.2:1 to 100:1 and preferably from about 0.4:1 to 20:1 parts by weight of hydroperoxy to amine complex.

The organoboron amine complex used in an adhesive composition in accordance with this invention generally comprises from about 0.1 to 5% by weight of the total composition and preferably from about 0.5 to 2.5% and the organic acid activator comprises from about 0.5 to 20%, preferably from about 1 to 12% by weight of the total composition. When a hydroperoxy compound is used in the adhesive composition, it generally comprises from about 0.2 to 10% by weight of the total composition and preferably from about 0.5 to 2%.

Other additives useful in elastomeric acrylic adhesives of this type, such as adhesion promoters, chelators, cross-linking agents, inhibitors, activators such as N,N-dimethyltoluidine as well as thickeners, plasticizers and diluents may also be used in the adhesive compositions of this invention.

The organoboron initiator system as described above comprises a two component system. When used in the acrylic rubber compositions of this invention generally the two parts are mixed in equal quantities of the monomer-polymer solution, but this may vary at the discretion of the user. That is, the stabilized organoboron compound is added to a solution of the elastomer or rubber polymer dissolved in the polymerizable acrylic monomer and the organo acid activator and optional hydroperoxy compound are added as a second part which also may be in a solution of the rubber polymer in acrylic monomer.

Adhesive compositions of this invention are particularly useful in structural and semi-structural applications employing glass, plastic or other clear substrates wherein a transparent or clear bond line is desired.

In the following examples, which are merely illustrative of the embodiments of this invention, all parts and percentages are given by weight and all temperatures are in degrees Celsius unless otherwise noted.

EXAMPLE I

An adhesive formulation was prepared consisting of two parts that were mixed in separate containers until all the rubber was dissolved. The first part (A) contained a monomer-polymer syrup which included the selected phenyl containing acrylic monomer benzyl methacrylate and a stabilized organoboron amine complex initiator. The second part (B) contained a similar monomer-polymer mixture containing another phenyl containing acrylic monomer, 2-phenoxyethyl methacrylate and an acid activator. The two adhesive composition parts were:

| Part A | |
|---|---|
| Stereon 840A (styrene-butadiene block copolymer) | 25 parts |
| Benzyl methacrylate | 60 parts |
| 2-ethylhexyl methacrylate | 15 parts |
| Triethylboron/1,3-diamine propane complex | 5 parts |

| Part B | |
|---|---|
| stereon 840A | 25 parts |
| 2-phenoxyethyl methacrylate | 50 parts |
| 2-ethylhexyl methacrylate | 15 parts |
| Methacrylic acid | 10 parts |
| Cumene hydroperoxide (CHP) | 1 part |

Equal parts of Part A and Part B were mixed and placed between glass slides. After about 1.5 to 2 minutes, the slides could not be separated and the formed adhesive bond was completely transparent with no visual distortion.

The adhesive composition described above was applied to steel plates and tested on an Instron tester. Tensile shear strength was measured in accordance with ASTM standard method D 1002-72 (1973) and found to be 1500 to 1700 psi and T-peel strength was measured using ASTM standard method D 1876-72 and found to be 13 to 16 pli (pounds/linear inch).

EXAMPLE II

An adhesive composition similar to Example I was prepared except that the benzyl methacrylate and 2-phenoxyethyl methacrylate were interchanged. Identical results were obtained.

EXAMPLE III

For comparison purposes, an adhesive composition as in Example I was prepared except that the benzyl methacrylate in Part A was replaced with isobornyl methacrylate, a non-phenyl containing acrylic monomer. After curing, a slightly hazy translucent bond was obtained.

EXAMPLE IV

For comparison purposes, an adhesive composition was prepared as in Example I except that the 2-phenoxyethyl methacrylate in Part B was replaced with tetrahydrofurfuryl methacrylate, a non-phenyl containing acrylic monomer. After curing, a hazy translucent bond line was formed.

EXAMPLE V

To further show the advantage of using the composition of this invention, the composition of Example I was changed by using varying amounts of isobornyl methacrylate in place of some or all of the benzyl methacrylate in Part A. Part B was unchanged.

| Benzyl Methacrylate Monomer (parts) | Isobornyl Methacrylate (parts) | Bondline |
| --- | --- | --- |
| 60 | 0 | Clear |
| 20 | 40 | Clear |
| 10 | 50 | Slight bluish haze |
| 5 | 55 | Slight haze |
| 2 | 58 | Hazy |
| 0 | 60 | Hazy |

In a similar manner the composition of Example I was changed by using varying amounts of tetrahydrofurfyl methacrylate to replace some or all of the 2-phenoxyethyl methacrylate of Part B. Part A was unchanged.

| 2-Phenoxyethyl methacrylate (parts) | Tetrahydrofurfyl (parts) | Bondline |
| --- | --- | --- |
| 50 | 0 | Clear |
| 10 | 40 | Clear |
| 5 | 45 | Slight haze |
| 2 | 48 | Hazy |
| 0 | 50 | Hazy |

It can be seen from these results that when using lower amounts of the phenyl containing acrylic monomer, i.e., about 40% or less, based on the total weight of acrylic monomer in the composition, an undesirable hazy or unclear bondline was formed.

What is claimed is:

1. In a curable two-part adhesive composition wherein one part comprises a polymerizable acrylic monomer and an effective amount of a stabilized organoboron amine complex initiator of the formula:

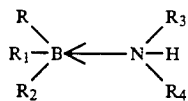

where R, $R_1$ and $R_2$ are alkyl of 1 to 10 carbon atoms or phenyl, $R_3$ and $R_4$ are hydrogen or alkyl of 1 to 10 carbon atoms; or

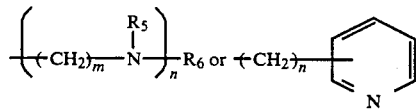

where $R_5$ and $R_6$ are hydrogen or alkyl of 1 to 10 carbon atoms, m is 2 to 10 and n is 1 to 6; and the second part contains an effective destabilizing amount of an organic acid activator having the formula:

R—COOH where R is H, alkyl or alkenyl of 1 to 8 carbon atoms or aryl of 6 to 10 carbon atoms, the improved composition providing a transparent or clear bond in the cured adhesive wherein the acrylic monomer comprises about 45% or more by weight, based on the total weight of acrylic monomer in the composition, of a monomer selected from the group consisting of benzyl acrylate or methacrylate, 2-phenoxyethyl acrylate or methacrylate, phenyl acrylate or methacrylate and 2-phenylethyl acrylate or methacrylate.

2. The adhesive composition of claim 1 wherein the selected acrylic monomer is benzyl methacrylate or 2-phenoxyethyl methacrylate.

3. The adhesive composition of claim 1 wherein the first part of the composition containing the acrylic monomer further comprises a rubber polymer.

4. The adhesive composition of claim 1 wherein there is about 50% or more by weight of the selected acrylic monomer.

5. The adhesive composition of claim 3 wherein the second part containing an organic acid activator further comprises a polymerizable acrylic monomer with a rubber polymer dissolved therein.

6. The adhesive composition of claim 5 wherein the selected acrylic monomer is benzyl methacrylate or 2-phenoxyethyl methacrylate.

7. The adhesive composition of claim 3 wherein in the organoboron amine complex R, $R_1$ and $R_2$ are alkyl of 1 to 4 carbons, $R_3$, $R_4$ and $R_4$ and $R_5$ are hydrogen or alkyl of 1 to 4 carbons, $R_6$ is hydrogen, m is 2 to 6 and n is 1 to 3.

8. The adhesive composition of claim 7 wherein the R group of the organic acid activator is an alkyl or alkenyl group of 1 to 4 carbons or an aryl of 6 to 8 carbons.

9. The adhesive composition of claim 8 wherein the first part of the composition containing the acrylic monomer further comprises a rubber polymer.

10. The adhesive composition of claim 9 wherein the second part containing an organic acid activator further comprises a polymerizable acrylic monomer with a rubber polymer dissolved therein.

11. The adhesive composition of claim 10 wherein from about 10 to 90% by weight of acrylic monomer and from about 5 to 80% by weight of the rubber polymer based on the total weight of the composition are used.

12. The adhesive composition of claim 11 wherein the selected acrylic monomer is benzyl methacrylate or 2-phenoxyethyl methacrylate.

* * * * *